United States Patent [19]

Sassa et al.

[11] 3,897,304

[45] July 29, 1975

[54] METHOD FOR CULTIVATION OF MICROORGANISMS

[75] Inventors: Nagamasa Sassa, Hyogo; Tarou Suzuki, Tokyo; Yoshihiro Kohchi, Hyogo; Shigeyuki Kubota, Osaka, all of Japan

[73] Assignee: Kanegafuchi Chemical Industries Co., Ltd., Osaka, Japan

[22] Filed: June 11, 1973

[21] Appl. No.: 368,788

[30] Foreign Application Priority Data

June 12, 1972 Japan.............................. 47-58811

[52] U.S. Cl................ 195/28 R; 195/111; 195/114; 195/115
[51] Int. Cl............................................... C12b 1/00
[58] Field of Search......... 195/28 R, 11 L, 114, 115

[56] References Cited

UNITED STATES PATENTS

| | | | |
|---|---|---|---|
| 3,725,200 | 4/1973 | Watanabe et al................. | 195/28 R |
| 3,767,527 | 10/1973 | Coty et al. ........................ | 195/28 R |

*Primary Examiner*—A. Louis Monacell
*Assistant Examiner*—R. B. Penland
*Attorney, Agent, or Firm*—Sughrue, Rothwell, Mion, Zinn & Macpeak

[57] ABSTRACT

A method for the aerobic cultivation of a microorganism in a culture medium containing one or more normal paraffin as the sole carbon source in the presence of at least one polyoxypropylene glycol diether to promote the growth rate and to increase the productivity of microbial cells is disclosed.

15 Claims, No Drawings

METHOD FOR CULTIVATION OF MICROORGANISMS

BACKGROUND OF THE INVENTION

1. Field of the Invention

This invention relates to a method for the cultivation of microorganisms and, more specifically, it relates to an aerobic liquid cultivation method for microorganisms such as yeast, bacteria and the like, using normal paraffin(s) as the sole carbon source.

2. Description of the Prior Art

In the cultivation of microorganisms using a hydrocarbon as a carbon source, the growth rate and the productivity of microbial cells are generally inferior as compared with those obtainable by cultivation of microorganisms using a carbohydrate as the main carbon source. This is because the hydrocarbons are usually insoluble in water and a large quantity of oxygen is required for cultivation using hydrocarbons.

U.S. Pat. No. 3,725,200 discloses the cultivation of microorganisms using n-paraffin(s) as a carbon source. The use of diethers is not disclosed or suggested therein. The present invention may, however, be viewed as an improvement on this patent since the conditions generally disclose therein can be applied to the present invention.

SUMMARY OF THE INVENTION

An object of this invention is to provide an improved method for the aerobic liquid cultivation of microorganisms, which does not have the disadvantages accompanying conventional cultivation methods, using normal paraffin(s) as the sole carbon source.

Another object of this invention is to provide an improved method for the aerobic liquid cultivation of microorganisms which is capable of providing a high growth rate and a high yield of microbial cells.

DETAILED DESCRIPTION OF THE INVENTION

The method of this invention can be applied not only to the cultivation of normal paraffin assimilable microorganisms alone but also to the mixed cultivation of microorganisms, i.e., a simultaneous cultivation of a normal paraffin assimilable microorganism and a normal paraffin inassimilable microorganism as disclosed in Japanese Patent Publication No. 8563/1970.

That is, the method of the present invention comprises culturing the microorganism using normal paraffin as the sole carbon source in the presence of at least one polyoxypropylene glycol diether in the culture medium, thereby increasing the growth rate of the microorganism and the yield of microbial cells.

The n-paraffin(s) used in the present invention is not particularly limited but good results are provided when the n-paraffin has from nine to 30 carbon atoms, more preferably from 12 to 17 carbon atoms. The distribution of the components or the percentages of any individual n-paraffin within this range is not important.

The polyoxypropylene glycol diethers are used in the medium at a concentration of from about 10 to about 2,000 ppm, preferably from 20 to 200 ppm. This concentration applies to both continuous and batch process. The diether(s) may be added to the normal paraffin(s) as a carbon source and the mixture of normal paraffin and diether(s) may be fed into a cultivation tank, or the diethers may be fed directly into the tank simultaneously with the normal paraffin(s).

As a result of extensive studies, it was found that polyoxypropylene glycol diethers are soluble in normal paraffins so that the micronization and dispersion of the normal paraffins in the culture medium can be promoted, and the micronized and dispersed normal paraffins can easily be absorbed on the surface of the microbial cells in the culture medium.

Also, the adsorbed normal paraffin was found to be generally not easily removed, even by a mechanical stirring or agitation of the culture medium, and therefore the assimilation rate of normal paraffin(s) by the microorganisms can be increased and the growth rate and the yield of the microorganisms in the cultivation can surprisingly be improved.

The microorganisms which can be used in the method of the present invention include normal paraffin assimilable yeasts such as *Candida novellus* as disclosed in Japanese Patent Publication No. 18562/1970, *Candida tropicalis*, *Candida guilliermondii*, *Candida rugosa*, *Candida parapusirosis*, *Zygosaccharomyces chikumaensis* and the like, and normal paraffin assimilable bacteria such as *Arthrobacter alkanicus*, *Bacillus megatherium*, *Bacillus subtilis*, *Lactobacillus casei* and the like. That is, some species of hydrocarbon-assimilable yeasts belonging to the genera of *Candida*, *Zygosaccharomyces* and others can be cultivated mixed with some species of hydrocarbon-inassimilable yeasts belonging to the genera of *Rhodotorula* and others in the presence of petroleum hydrocarbons, and, as a result, the yield and the crude protein content of the resulting cells can be substantially increased. Representative examples of the hydrocarbon-inassimilable microorganism which can be used in the mixed cultivation of the present invention are *Candida utilis*, *Rhodotorula rubra*, *Rhodotorula minuta* and the like.

The polyoxypropylene glycol diethers used as additives to the culture medium in accordance with the present invention should preferably fulfil the following requirements:

1. substantially soluble in normal paraffins;
2. incompatible with water at the cultivation temperatures;
3. no physiologically inhibitory activity on the microorganism to be cultured; and
4. have an activity as low as possible for reducing interfacial tension between the normal paraffin(s) and the culture liquid at the concentration of the normal paraffin(s) used in the culture medium.

As a result of various investigations on a wide variety of compounds, it was found that a certain type of polyoxypropylene glycol diethers as described hereinafter in greater detail meets the above requirements. That is, 1. the polyoxypropylene glycol diethers used in the present invention can be represented by the general formula

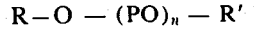

$$R-O-(PO)_n-R'$$

wherein R and R' may be the same or different and each represents a saturated alcohol residue having one to 30 carbon atoms, preferably from 12 to 16 carbon atoms, and can be a residual group from a single alcohol or a mixture of different alcohols, and $(PO)_n$ represents a polyoxypropylene oxide residue;

2. the polyoxypropylene glycol diethers desirably have an average molecular weight of from 500 to 5,000, preferably from 1,000 to 2,000; and 3. the polyoxypropylene glycol diethers as defined in (1) above are substantially insoluble in water but soluble in any proportions in normal paraffins.

The polyoxypropylene glycol diethers as defined above can be prepared in accordance with the processes disclosed in British Pat. Specification No. 813,495, French Pat. No. 1,272,589 and U.S. Pat. No. 3,393,242.

Representative polyoxypropylene glycol diethers which are suitable for the process of the present invention are, for example, $C_{14}H_{29}O(PO)_{14}C_{14}H_{29}$: Polyoxypropylene glycol ditetradecyl ether, $C_{16}H_{33}O(PO)_{19}CH_3$: Polyoxypropylene glycol hexadecyl methyl ether, $C_{16}H_{33}O(PO)_{14}C_{12}H_{25}$: Polyoxypropylene glycol hexadecyldodecyl ether, and $C_{12}H_{25}O(PO)_{20}C_4H_9$: Polyoxypropylene glycol dodecylbutyl ether.

The culture medium used in the present invention can be any well-known aqueous nutrient medium as is commonly employed in culturing yeasts or bacteria. In addition to normal paraffins as the sole carbon source, there can be added to the culture medium inorganic or organic nitrogenous compounds such as ammonia, ammonium sulfate, ammonium chloride, urea and the like, phosphorus compounds such as phosphoric acid, potassium hydrogen phosphate, potassium dihydrogen phosphate and the like, and other inorganic salts of potassium, magnesium, iron, zinc, etc., such as potassium chloride, magnesium sulfate, zinc sulfate, ferrous sulfate, ferric sulfate and the like, and optionally organic salts such as iron citrate, ammonium acetate, etc., as well as known growth promoting agents such as corn steep liquor, yeast extract, peptone and the like, and a growth factor such as biotin.

In culturing the normal paraffin assimilable microorganism in accordance with the method of this invention, no specific cultivation conditions are required. The cultivation can be carried out in a batch or continuous manner at a pH value in the range of from 3.5 to 6.0, preferably from 4.0 to 5.0, at a temperature in the range of from 25° to 40°C, preferably from 27° to 35°C. The n-paraffin concentration is most preferably maintained in the range of from 0.01 to about 1% (wt./vol.) in a continuous process and is most preferably from about 2 to about 3% (wt./vol.) in a batch process. The cultivation is preferably carried out while introducing an oxygen-containing gas such as sterile air into the culture medium by, for example, bubbling, to cause the aerobic cultivation to easily proceed. As will be apparent to one skilled in the art, in an aerobic process aeration is necessary, but the rate of aeration is not a critical factor and can be established in accordance with the well known procedures for optimizing the rate aeration which are known to the art. For instance, one will usually set the rate of aeration for any particular cultivation depending upon the mode of cultivation, the microorganisms used, the volume of the culture medium and the like. No novelty is claimed for the aeration per se in the present invention, and procedures in accordance with the art are used. Cultivation is typically at atmospheric pressure, though this is not very important.

The present invention is further illustrated by the following examples, but they are not to be construed as limiting the scope of this invention.

The rate of air introduction was 30 liters/minute in the jar fermentor and 1,800 liters/minute in the 2,000 liter fermentor, respectively, over the cultivation time.

While the cell concentration is not overly important in the present invention, and with most processes a highly preferred range of operation does exist. For instance, in a continuous process it is preferred to maintain cell concentration at from 1.5 to 2%, and in batch concentration it is most preferred that the final cell concentration be from 2 to 3%. Keeping in line with the spirit of the present invention, these parameters provide most excellent results.

Examples 1, 2 and 3 illustrate the effect of polyoxypropylene glycol diethers on yield and the relative growth rate of the indicated yeasts; Example 4 illustrates the activity of polyoxypropylene glycol diethers which promote the adhering of normal paraffin(s) to the microbial cells; and Example 5 illustrates the effect of polyoxypropylene glycol diethers on the yield of the indicated bacteria. All examples were at atmospheric pressure.

EXAMPLE 1

Into 500 ml Sakaguchi flasks were charged the following compositions:

| (I) Normal Paraffin | | |
|---|---|---|
| Normal paraffin ($C_{12}$–$C_{17}$) | 1.0 | g |
| (II) Nutrient Liquid | | |
| Water | 50 | ml |
| Urea | 0.25 | g |
| $KH_2PO_4$ | 0.2 | g |
| $K_2HPO_4$ | 0.2 | g |
| $MgSO_4.7H_2O$ | 60 | mg |
| $FeSO_4.7H_2O$ | 0.5 | mg |
| $MnSO_4.7H_2O$ | 0.5 | mg |
| NaCl | 1.5 | mg |
| $ZnSO_4.7H_2O$ | 0.5 | mg |
| $CuSO_4.7H_2O$ | 0.25 | mg |
| Biotin | 0.0005 | mg |

The resulting culture media were then sterilized in an autoclave at a temperature of 120°C for 10 minutes and the pH of the media was adjusted to 5.0 with sodium hydroxide. The media were then inoculated with one platinum loop inoculum of *Candida novellus* (a yeast of Genus Candida) and polyoxypropylene glycol hexadecyl dodecyl ether (Compound 1) having the formula $C_{16}H_{33}O(PO)_{14}L_{12}H_{25}$ was added to the media in an amount of 1 mg, 3 mg and 5 mg, respectively. The microorganism in the media was then shake-cultured at a temperature of 30°C for 24 and 48 hours, respectively. The results obtained are shown in Table 1 below.

Table 1

Amount of Microbial Cells After Completion of Cultivation (weight % yield of dried cells based on the total volume of harvested culture)

| Period of Cultivation | Amount of Compound 1 Added | | | |
|---|---|---|---|---|
| | O (Control) | 1 mg | 3 mg | 5 mg |
| 24 | 0.80% | 0.92% | 0.98% | 1.06% |
| 48 | 1.58% | 1.76% | 1.80% | 1.98% |

EXAMPLE 2

Into a 30 liter jar fermentor were charged continuously normal paraffin ($C_{12}$–$C_{17}$) and the nutrient liquid having the same composition as described in Example 1. The normal paraffin concentration in the resulting culture medium was 0.5% (W/V). The medium was then inoculated with mixed microorganisms consisting of *Candida novellus* and *Rhodotorula rubra* (normal paraffin inassimilable species) and the microorganisms were cultured while maintaining a microbial cell concentration of 1.5% (W/V), a temperature of 30°C, a pH value of 4.5 (adjusted with NaOH) and a culture volume of 18 l. During the cultivation, Compound 1 described in Example 1 was added continuously to the medium at a concentration in the range of 30 to 200 ppm in the medium. The results obtained are shown in Table 2 below.

The same cultivation was conducted without using Compound 1, and the results obtained from this run were also shown in Table 2 as control.

Table 2

|  | Control | Addition of Compound 1 |
| --- | --- | --- |
| Cell Concentration in Jar Fermentor | 1.45 | 1.46 |
| Relative Growth Rate (1/hr) | 0.20 | 0.24 |
| Yield (relative to n-paraffin, W/W %) | 102 | 115 |

EXAMPLE 3

Into a 2000 liter agitation type fermentor normal paraffins having the same composition as those used in Example 1 ($C_{12}$–$C_{17}$) and the nutrient liquid having the same composition as described in Example 1 were continuously charged. The normal paraffin concentration in the resulting culture medium was 0.5% (W/V). The medium was then inoculated with a mixed microorganisms consisting of *Candida novellus* and *Rhodotorula rubra*, and the microorganisms were cultured while maintaining a microbial cell concentration of 1.5% (W/V) an aeration at a rate of 1,800 l/minute, a temperature of 30°C, a pH value of 4.5 and a culture volume of 1,200 l. During the cultivation, Compound 1 described in Example 1 was added continuously to the medium at a concentration in the range of 30 to 200 ppm in the medium. The results obtained are shown in Table 3 below. The same cultivation was conducted without using Compound 1 and the results obtained from this run are also shown in Table 3 as a control.

Table 3

|  | Control | Addition of Compound 1 |
| --- | --- | --- |
| Cell Concentration % (W/V) | 1.52 | 1.50 |
| Relative Growth Rate (1/hr) | 0.20 | 0.22 |
| Yield (relative to n-paraffin, W/W%) | 105 | 116 |

EXAMPLE 4

Each of the cultures obtained in Example 3 (the control and with the addition of Compound 1) was subjected to continuous cell separation to separate a yeast milk and a supernatant liquid, and the normal paraffin concentration in each phase was determined by infrared absorption spectrum analysis. The results obtained are shown in the Table below together with the results obtained from the cultures prior to the cell separation. In the table, all percentages are weight per volume.

Culture Analysis Prior to Cell Separation

|  | Control | Addition of Compound 1 |
| --- | --- | --- |
| Cell Concentration | 1.50% | 1.47% |
| Substrate Normal Paraffin | 0.48% | 0.52% |
| Separated Liquid Volume | 200 liter | 200 liter |

Culture Analysis After Cell Separation

| Yeast Milk Phase | Control | Addition of Compound 1 |
| --- | --- | --- |
| Cell Concentration | 6.00% | 6.12% |
| Substrate Normal Paraffin Conc. | 1.60% | 2.10% |
| Liquid Volume | 50 l | 48 l |
| Supernatant |  |  |
| Cell Concentration | — | — |
| Substrate Normal Paraffin Conc. | 0.11% | 0.02% |
| Liquid Volume | 150 l | 152 l |

As is apparent from the above results, the normal paraffin is contained in the yeast milk in a larger proportion in the culture to which Compound 1 has been added than in the control culture, though the amount in the normal paraffin was approximately the same in the control and the Compound 1-addition cultures prior to the cell separation. This indicates that Compound 1 effectively increased the adsorption of normal paraffin on microbial cells.

EXAMPLE 5

A nutrient liquid containing the following composition in tap water was prepared:

| Phosphoric Acid | 0.5% |
| --- | --- |
| Ammonium Sulfate | 0.3% |
| NaCl | 0.1% |
| $MgSO_4 \cdot 7H_2O$ | 2,000 ppm |
| $CaCl_2 \cdot 2H_2O$ | 400 ppm |
| $FeSO_4 \cdot 7H_2O$ | 400 ppm |
| $ZnSO_4 \cdot 7H_2O$ | 80 ppm |
| $MnSO_4 \cdot 6H_2O$ | 8 ppm |
| $CuSO_4 \cdot 5H_2O$ | 2 ppm |
| pH adjusted to 7.0 with KOH | |

30 ml of the above nutrient liquid and 0.3 g of normal paraffins ($C_{12}$–$C_{17}$) were charged into various 500 ml Sakaguchi flasks, and, after sterilization in an autoclave at 120°C, the medium was inoculated with one platinum loop inoculum of *Arthrobacter alkanicus*. Polyoxypropylene glycol hexadodecyl ether having the formula $C_{16}H_{33}O(PO)_{14}C_{12}H_{25}$ (Compound 1) was then added to the inoculated medium in an amount of 0.6 mg, 1.8 mg and 3.0 mg, respectively, and the microorganisms was shake-cultured at a temperature of 30°C for 18 and 36 hours, respectively, to obtain the results shown in Table 4 below. The cultivations were also conducted under the same conditions but without adding Compound 1 and the results obtained from these runs are also shown in Table 4.

Table 4

| Period of Cultivation | Amount of Microbial Cells After Completion of Cultivation (weight % yield of dried cells based on the total volume of harvested culture) Amount of Compound 1 Added | | | |
|---|---|---|---|---|
| | 0 (Control) | 0.6 mg | 1.8 mg | 3.0 mg |
| 18 | 0.37 | 0.46 | 0.51 | 0.58 |
| 36 | 0.72 | 0.88 | 0.91 | 0.99 |

While the invention has been described in detail and with reference to specific embodiments thereof, it will be apparent to one skilled in the art that various changes and modifications can be made therein without departing from the spirit and scope thereof.

What is claimed is:

1. In a method for the aerobic cultivation of a microorganism in a culture medium containing one or more normal paraffins as the sole carbon source, the improvement comprising conducting the cultivation in the presence of one or more polyoxypropylene glycol diethers, said diethers having the formula $$R—O—(PO)_n—R^1$$

wherein R and $R_1$ may be the same or different and each represents a saturated alcohol residue having 1 to 30 carbon atoms from a single alcohol or a mixture of different alcohols and $(PO)_n$ represents a polyoxypropylene oxide residue, said diether having an average molecular weight of from 500 to 5,000.

2. A method according to claim 1 wherein said microorganism is a normal paraffin assimilable microorganism or a mixed microorganism of normal paraffin assimilable and inassimilable microorganisms.

3. A method according to claim 1 wherein said cultivation is conducted in a batch manner.

4. A method according to claim 1 wherein said cultivation is conducted in a continuous manner.

5. A method according to claim 1 wherein said polyoxypropylene glycol diether(s) is/are used at a concentration in the range of from about 10 to about 2,000 ppm in the medium.

6. A method according to claim 1 wherein said polyoxypropylene glycol diethers are introduced into the medium as a mixture of normal paraffin(s) and polyoxypropylene glycol diether(s).

7. A method according to claim 1 wherein said cultivation is conducted in a culture medium having a pH of from 3.5 to 6.0 and containing normal paraffin in the range of from 0.01 to 1% by weight per volume of the culture medium at a temperature of from 25° to 40°C.

8. A method according to claim 2 wherein said normal paraffin assimilable microorganism is selected from the group consisting of Candida novellus, Candida tropicalis, Candida guilliermondii, Candida rugosa, Candida parapusirosis, Zygosaccharomyces chikumaensis, Arthrobacter alkanicus, Bacillus megatherium, Bacillus subtilis and Lactobacillus casei.

9. A method according to claim 1 wherein said polyoxypropylene glycol diether is selected from the group consisting of polyoxypropylene glycol ditetradecyl ether, polyoxypropylene glycol hexadecylmethyl ether, polyoxypropylene glycol hexadecyldodecyl ether, polyoxypropylene glycol dodecylbutyl ether or a mixture thereof.

10. A method according to claim 1 wherein the one or more n-paraffins have from nine to 30 carbon atoms.

11. A method according to claim 1 wherein the one or more n-paraffins have from 12 to 17 carbon atoms.

12. A method according to claim 1 wherein in a continuous process the n-paraffin concentration is maintained at 0.01 to about 1% (wt./vol.) and in a batch process the concentration n-paraffin is initially from 2 to 3% (wt./vol.).

13. A method as claimed in claim 1 wherein the system is aerated with air during the cultivation period.

14. A method according to claim 3 wherein the final cell concentration is from 2 to about 3%.

15. A method according to claim 4 where the cell concentration is maintained in the range of from 1.5 to 2%.

* * * * *